United States Patent [19]

Mori

[11] Patent Number: 4,653,223
[45] Date of Patent: Mar. 31, 1987

[54] APPARATUS FOR PLANT CULTURE

[76] Inventor: Kei Mori, 3-16-3-501, Kaminoge, Setagaya-ku, Tokyo, Japan

[21] Appl. No.: 624,657

[22] Filed: Jun. 26, 1984

[30] Foreign Application Priority Data

Jul. 1, 1983 [JP] Japan ................................. 58-119866

[51] Int. Cl.$^4$ ............................................. A01G 9/00
[52] U.S. Cl. ..................................................... 47/17
[58] Field of Search ..................... 47/DIG. 6, 17, 18; 126/440, 429, 428, 425; 362/35, 217, 220, 269, 270, 275, 285, 367, 372, 805, 806

[56] References Cited

U.S. PATENT DOCUMENTS

| 3,348,922 | 10/1967 | Karpovich et al. | 47/17 |
| 4,184,479 | 1/1980 | Ratliff, Jr. | 47/17 |
| 4,198,953 | 4/1980 | Power | 126/428 |
| 4,201,197 | 5/1980 | Dismer | 126/440 |
| 4,430,694 | 2/1984 | Kolvumäki et al. | 362/285 |
| 4,430,828 | 2/1984 | Oglevee et al. | 47/17 |
| 4,441,145 | 4/1984 | Antkowiak | 362/805 |

FOREIGN PATENT DOCUMENTS

| 867473 | 1/1953 | Fed. Rep. of Germany | 362/122 |
| 914004 | 3/1982 | U.S.S.R. | 47/DIG. 6 |

Primary Examiner—Robert A. Hafer
Assistant Examiner—Bradley M. Lewis
Attorney, Agent, or Firm—Jordan and Hamburg

[57] ABSTRACT

An apparatus for plant cuture is disclosed which allows plants to be effectively grown even in basements and other places where solar radiation is unavailable, utilizing combined illumination by solar rays and artificial rays. Light source assemblies emitting the mixed rays are mounted on a housing in which plants grow and are movable therealong to periodically illuminate the plants, thereby promoting efficient photosynthesis. The light source assemblies may even be shared by a plurality of such housings which are arranged side by side or one upon the other.

24 Claims, 10 Drawing Figures

APPARATUS FOR PLANT CULTURE

BACKGROUND OF THE INVENTION

The present invention relates to an apparatus for cultivating plants and, more particularly, to an apparatus for plant culture which supplies plants with optical energy optimum for their growth by combining collected solar radiation and artificial radiation, which corresponds to skylight.

As well known, the primary requisite for the effective growth of plants is the adequate supply of nourishment, light, carbon dioxide ($CO_2$), water, etc., as well as optimumly conditioned temperature and humidity. Difficulty has been experienced in satisfying all of such conditions. Another important factor for the growth of plants is, as a matter of course, the ground. Today, espctically in urban areas, spaces available for cultivating plants, e.g. lands, are quite limited, not to speak of sunny lands which are necessary for the growth of plants.

In light of the above-discussed situation, there has been proposed a system in which solar rays are converged by lenses or the like into a fiber optic cable so that the converged light may propagate through the cable to a plant cultivating apparatus, which may be located in any desired place. The light supplies optical energy to plants in the cultivating apparatus.

A solar collector heretofore proposed for use with such a system includes a number of lenses which are bundled up by a frame with a solar sensor mounted thereon. The lens assembly is rotatable about a first axis and a second axis which extends perpendicular to the first axis. The lens assembly and a drive mechanism associated therewith are encapsulated in a transparent dome-shaped housing. In operation, the lens assembly is moved about the first and second axes in response to an output of the solar sensor so that its light receiving surface is constantly directed sunward. The light converged by the lenses may be transmitted by a fiber optic cable to any desired place.

The problem with the prior art system described is that the light transmitted by the fiber optic cable contains direct solar rays but not indirect ones (skylight). In the growth of plants, skylight is necessary for the plants to maintain the base power for growth while direct solar rays (intense light) are necessary for the plants to germinate, flower and fruit and, further, for the fruits to grow and ripen. While plants perform photosynthetic reactions utilizing optical energy fed thereto and the resultant nutriment is transported to their trunks, fruits, etc., the transport occurs rather effectively when the plants are not illuminated, oxygen is present, and the temperature is relatively low. Stated another way, while photosynthetic reactions and the transport of nutriment produced thereby are essential for the effective growth of plants, it is preferable for effective photosynthesis that the supply of light to plants be interrupted repeatedly at predetermined intervals. No effective implementation has heretofore been proposed for the effective supply of combined direct and indirect solar rays for plant culture or for the intermittent illumination.

SUMMARY OF THE INVENTION

It is therefore an object of the present invention to provide an apparatus for plant culture which allows plants to be effectively grown even in the shade.

It is another object of the present invention to provide an apparatus for plant culture which supplies light analogous to skylight to plants together with direct solar rays which are collected by such a solar collector as previously described one.

It is another object of the present invention to provide an apparatus for plant culture which intermittently supplies plants with light for efficient photosynthesis.

It is another object of the present invention to provide a generally improved apparatus for plant culture.

An apparatus for plant culture of the present invention comprises a solar ray collector for collecting solar rays to introduce the solar rays into one end of light conducting members, at least one housing for accommodating plants, and light source assemblies mounted on a side wall of the housing and each comprising an integral assembly of the other end of the light conducting members and an artificial light source, the light source assemblies being movable along the side wall of the housing to sequentially supply light to the plants in the housing.

In accordance with the present invention, an apparatus for plant culture is disclosed which allows plants to be effectively grown even in basements and other places where solar radiation is unavailable, utilizing combined illumination by solar rays and artificial rays. Light source assemblies emitting the mixed rays are mounted on a housing in which plants grow and are movable therealong to periodically illuminate the plants, thereby promoting efficient photosynthesis. The light source assemblies may even be shared by a plurality of such housings which are arranged side by side or one upon the other.

The above and other objects, features and advantages of the present invention will become apparent from the following detailed description taken with the accompanying drawings.

DESCRIPTION OF THE PREFERRED EMBODIMENTS

While the apparatus for plant culture of the present invention is susceptible of numerous physical embodiments, depending upon the environment and requirements of use, substantial numbers of the herein shown and described embodiments have been made, tested and used, and all have performed in an eminently satisfactory manner.

Before entering into detailed description of the present invention, a brief reference will be made to a prior art solar collector which is applicable to the present invention, shown in FIG. 1. The solar collector comprises a lens assembly generally designated by the reference numeral 10. While in use, the lens assembly 10 is encapsulated in a transparent, generally dome-shaped head portion 12 which constitutes a housing 14 in combination with a generally cylindrical base portion 16.

The lens assembly 10 comprises a plurality of lenses 18 and a solar sensor 20 responsive to a position of the sun. The lenses 18 and solar sensor 20 are bundled up together by a frame 22. The number of the lenses 18 may be seven or nineteen, for example. The lens assembly 10 inclusive of the frame 22 is mounted on a shaft 24 which defines a first axis and is rotated by a first motor 26. A generally C-shaped arm 28 supports the lens assembly 10, shaft 24 and motor 26 and, in turn, is mounted on a shaft 30. The shaft 30 is rotated by a second motor (not shown) and defines a second axis which is perpendicular to the first axis.

In operation, the first and second motors are controlled in responce to an output of the solar sensor 20 so that the lens assembly 10 tracks the sun throughout the day. The solar rays converged by the lenses 18 are introduced into optical fibers (not shown) which, in the form of a bundle, extend respectively from the focal points of the lenses to a desired location. The light, therefore, is transmitted by the optical fibers to the desired location.

Figure 1:
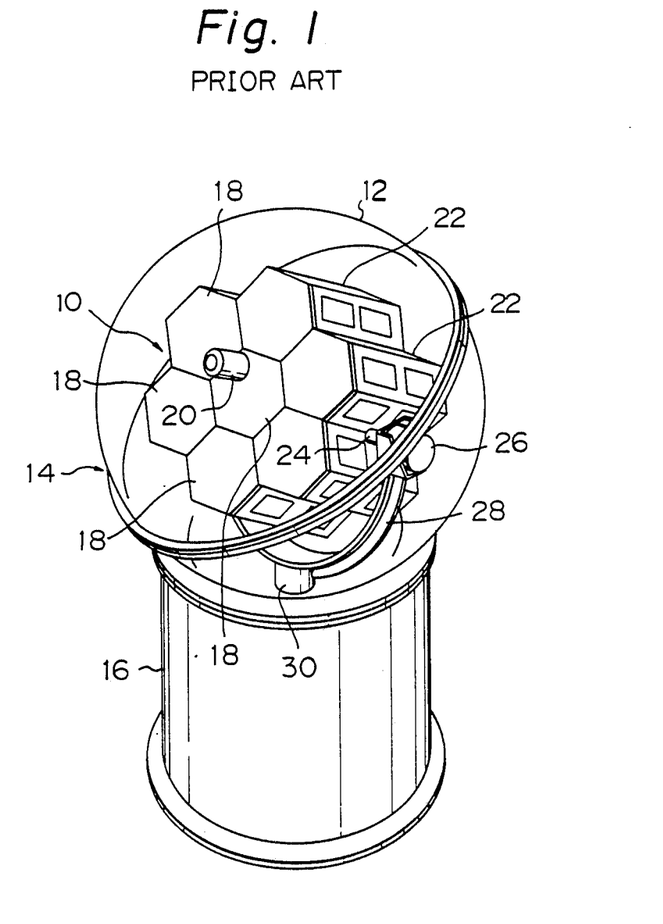
FIG. 1 is a perspective view of a solar collector applicable to the present invention.
Figure 2A:
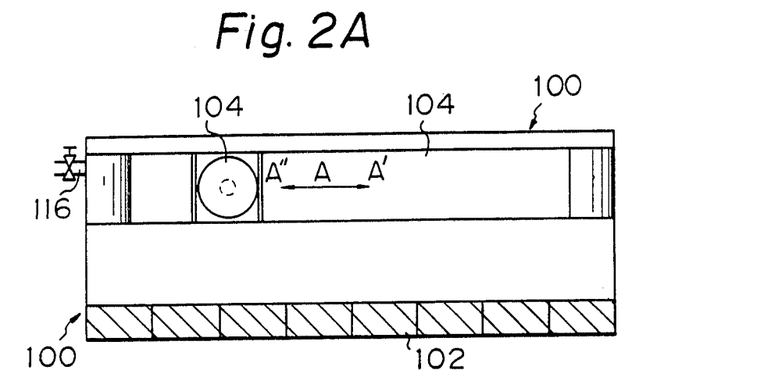
FIG. 2A is a front view of an apparatus for plant culture embodying the present invention.
Figure 2B:
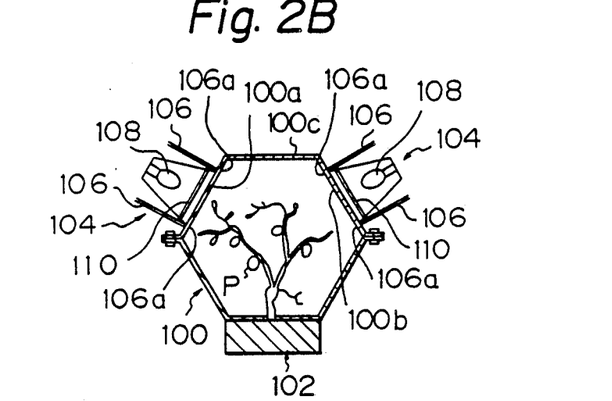
FIG. 2B is a sectional side elevation of the apparatus shown in FIG. 2A.
Figure 2C:
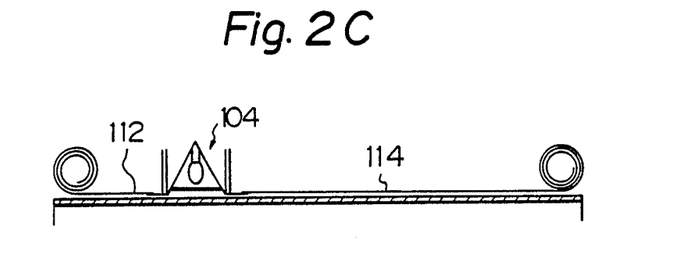
FIG. 2C is a view of screens associated with a light source unit included in the apparatus of FIG. 2A.

Referring to FIGS. 2A–2C, an apparatus for plant culture embodying the present invention is shown. The apparatus includes a housing, generally 100, which is shaped to have a hexagonal section and placed horizontally in any desired place. The housing 100 has in its bottom portion a culture bed 102 in which plants P are set. A unitary light source assembly, generally 104, is movably mounted on the housing 100 as will be described, and comprises light transmitting members 106 and an artificial light source 108. The light transmitting members 106 individually extend from the light source assembly 104 to, for example, the solar collector shown in FIG. 1 and terminate respectively at the focal points of the lenses 18.

Direct solar rays introduced into the solar collector are converged by the lenses 18 (FIG. 1) to propagate through their associated light transmitting members 106 as far as light output ends 106a of the members 106. The artificial light source 108, on the other hand, emits light which is analogous to indirect solar rays, or skylight.

In the illustrative embodiment, two identically constructed light source assemblies 104 are mounted on the hexagonal housing 100 in such a manner as to move respectively along two upper opposite sides 100a and 100b of the hexagon each in a direction indicated by an arrow A in FIG. 2A. In this construction, the light emanating from the opposite light source assemblies 104 is sequentially supplied to the plants P in the housing 100.

As previously discussed, growth of plants is accelerated when light is supplied in an intermittent fashion rather than when it is supplied continuously. That is, considering the fact that photosynthetic reactions are made up of what may be called light rections and dark reactions, it is desirable for faster growth of plants to illuminate the plants with intense light during the light reactions and to make the intensity of illumination practically zero or at least reduce it during the dark reactions. The movable light source system in the illustrative embodiment saves optical energy necessary for illuminating the interior of a culture housing, compared to a traditional fixed light source system; in other words, for a given light source capacity, the movable light source system accommodates a larger area for plant culture than the fixed light source system. Additionally, due to the movement of each light source 104, those portions of the leaves of the plants P which shade each other change moment by moment to cause light reactions and dark reactions to effectively alternate with each other, thereby further promoting effective growth of the plants P.

Each light source assembly 104 is constructed to emit effectively combined two different kinds of light: direct solar radiation conducted by the light transmitting members 106 as previously described, and artificial light emanating from the artificial light source 108 and analogous to skylight.

As shown in FIG. 2B, each light source assembly 104 additionally includes a filter 110 which is transparent for light in the visible range only. The filter 110 transmits only the visible components of the light which emanates from the artificial light source 108, thereby promoting still more effective plant culture. For the same purpose, the light transmitting members 106 may have their ends opposite to the light output ends 106a positioned at the focal points of the lenses 18 (FIG. 1) for visible light.

Furthermore, in this particular embodiment, screens 112 and 114 are employed for more effective utilization of light emanating from each light source assembly 104, as shown in FIG. 2C. In FIG. 2C, the screens 112 and 114 are located at opposite sides of the light source assembly 104 to be movable integrally therewith. An arrangement is made such that while the light source unit 104 moves in a direction A' (FIG. 2A), the screen 112 is paid out and the screen 114 is retracted and, while the light source 104 moves in a direction A'' (FIG. 2A), the screen 114 is paid out and the screen 112 is retracted. The inner surfaces of the screens 112 and 114 are treated for reflection. In this connection, the inner surfaces of the housing 100 per ce may also be formed reflective.

With the construction described so far, the apparatus in the illustrative embodiment succeeds in effectively supplying light and supplying sufficient amounts of nourishment and water via the culture bed 102. The apparatus is also furnished with a device for the supply of carbon dioxide ($CO_2$), which is another essential consideration for photosynthesis. In detail, the housing 100 has a hermetically sealed structure and, as shown in FIG. 2A, a valved conduit 116 communicates the interior of the housing 100 to a $CO_2$-containing air supply (not shown). In this construction, $CO_2$-containing air at an adequate temperature and humidity is admitted into the housing 100 via the conduit 116 to set up an atmosphere which is optimum for plant growth.

A part of the peripheral wall of the hermetically sealed housing 100, e.g. upper lid 100c, may be made transparent or comprised of a half-mirror in order to allow one to see the plants P in growth from outside the housing 100.

Figure 3:
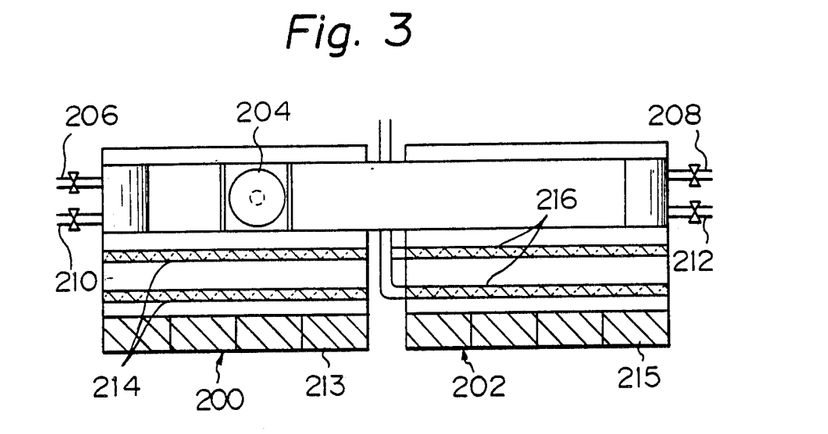
FIG. 3 is a view similar to FIG. 2A but showing another embodiment of the present invention.

Referring to FIG. 3, another embodiment of the present invention is shown. As shown, a plurality of housings, two housings 200 and 202 in this particular embodiment, are positioned side by side and share light source assemblies 204 with each other. In this construction, while the reciprocating light source assemblies 104 are positioned on the housing 200, for example, the interior of the housing 200 is light and that of the other housing 202 is dark. This effectively sets up repetitive light and dark periods which correspond respectively to days and nights and usually last two hours each. In the light periods, photosynthetic reactions are effected and, in the dark periods, nutriment is transported from the leaves of the plants to the fruit via the trunks. In FIG. 3, valved conduits 206 and 208 are associated respectively with the nearby housings 200 and 204 for supplying $CO_2$-containing air at a relatively high suitable temperature and a suitable humidity, thereby facilitating photosynthetic reactions during the light periods. Also, valved conduits 210 and 212 are associated respectively with the housings 200 and 202 for supplying oxygen necessary for respiration at a relatively low temperature. The light source assemblies 204 are essentially identical in construction with the light source assemblies 104 shown in FIGS. 2A and 2B. The reference numerals 213 and 215 in FIG. 3 designate culture beds which are similar to the culture bed 102 shown in FIGS. 2A and 2B.

Further, the double-housing type apparatus shown in FIG. 3 includes light radiating members, or photoradiator, 214 arranged in one the housings 200 and light radiating members, or photoradiators, 216 arranged in the other housing 202. Each of the photoradiators 214 and 216 consists of a light transmitting element. Solar rays propagating through light transmitting members from a solar collector such as one shown in FIG. 1 are radiated from the photoradiators 214 and 216 inside the housings 200 and 202, thereby still more enhancing effective growth of plants P.

Figure 4:
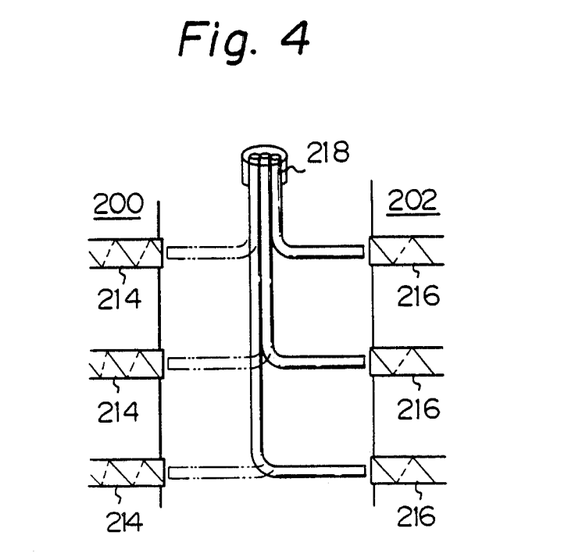
FIG. 4 is a view of a bundle of light conducting members applicable to the construction shown in FIG. 3.

In detail, as shown in FIG. 4, solar rays collected by the solar collector shown in FIG. 1 are conducted by light transmitting members 218 to the cultivating apparatus. The photoradiators 214 are fixed in place in the housings 200, and the photoradiators 216 in the housing 202. The facing ends of the two groups of photoradiators 214 and 216 are arranged such that they are alternately opposed by the adjacent ends of the light transmitting members 218. Specifically, while the light source assemblies 204 are positioned on the housing 202, the light output ends of the light transmitting members 218 face the light input ends of the photoradiators 216 in the housing 202, as indicated by solid lines in FIG. 4. When the light source assemblies 104 have transferred from the housing 202 to the housing 200, then the orientation of the light transmitting members 218 is switched such that their ends face those of the photoradiators 214 installed in the housing 200, as indicated by phantom lines in FIG. 4. Such switching actions of the light transmitting members 218 may be effected by reciprocating motions of the light source assemblies 120 between the two nearby housings 200 and 202.

In the above construction, the photoradiators 214 and 216 are supplied with solar rays while their associated housings 200 and 202 are in a light period and not when they are in a dark period. This allows the solar radiation to be distributed to any of the housing 200 and 202 which is in a light period without interfering with the other housing which is then in a dark period, thereby achieving even more effective utilization of solar radiation for the growth of plants.

Figure 5A:
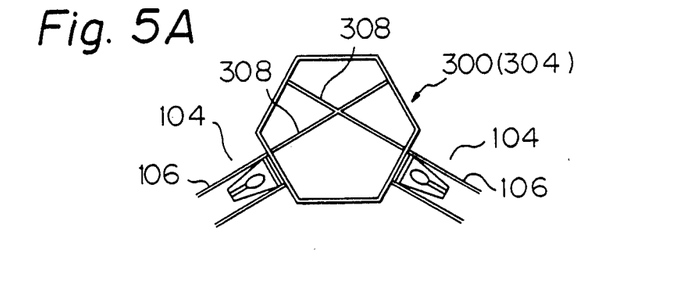
FIG. 5A is a plan view of another embodiment of the present invention.
Figure 5B:
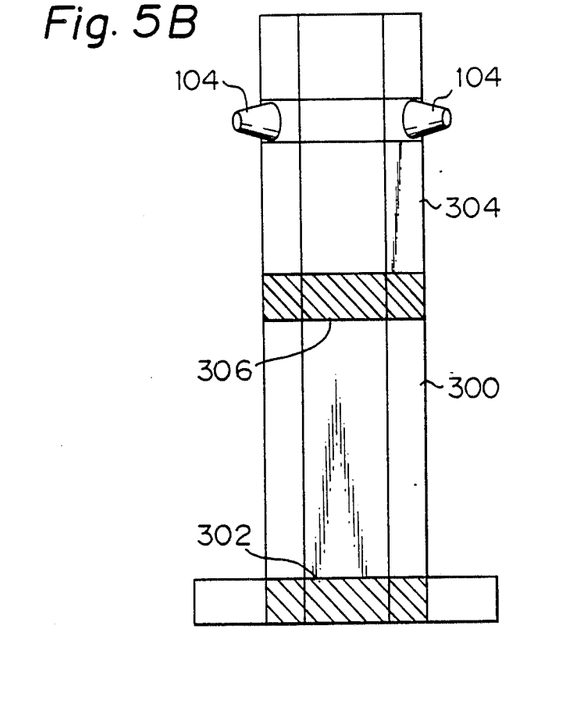
FIG. 5B is a front view of the apparatus shown in FIG. 5A.

Referring to FIGS. 5A and 5B, still another embodiment of the present invention is shown which is suitable for the culture of relatively tall plants. As shown, the apparatus in FIGS. 5A and 5B is another double-housing type construction which is the stacked or upright version of the apparatus of FIG. 3. It will be apparent, however, that such an upright housing configuration is also attainable by vertically lengthening the single apparatus of FIGS. 2A and 2B and, for this reason, the structural elements common or similar to those of FIGS. 2A and 2B will be designated by like reference numerals for simplicity. In FIGS. 5A and 5B, a housing 300 with a culture bed 302 and a housing 304 with a culture bed 306 are stacked one upon the other. Photoradiators 308 are arranged respectively along the reciprocating paths of light source assemblies 104 and in such a manner as to face the light outlet ends of light transmitting members 106 of the assemblies 104. Specifically, the arrangement of the photoradiators 308 is such that when the light source assemblies 104 have moved until the light outlet ends of the light transmitting members 106 have faced the light inlet ends of their associated photoradiators 308, solar radiation is introduced into the photoradiators 308.

Figure 6A:
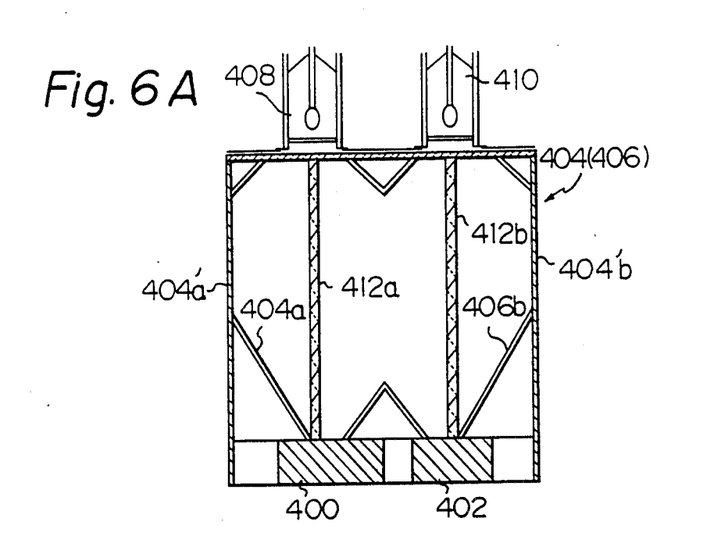
FIG. 6A is a front view of an apparatus for plant culture embodying the present invention according to a further embodiment.
Figure 6B:
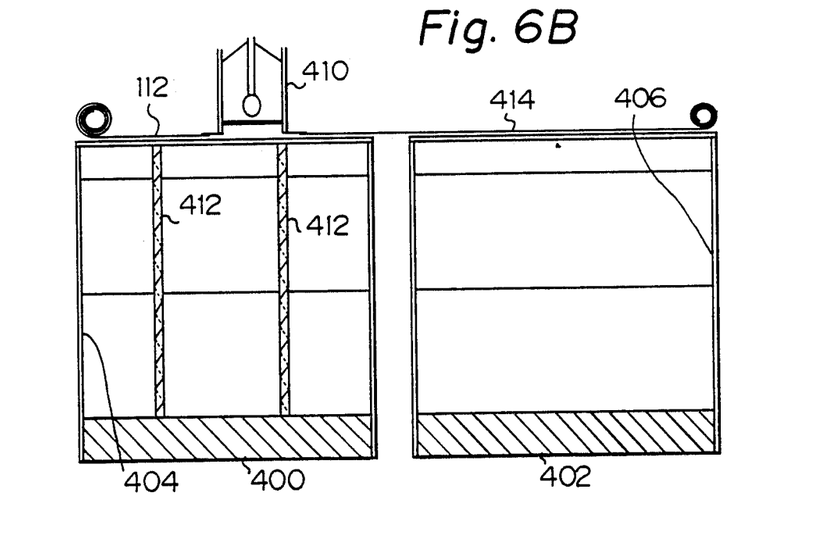
FIG. 6B is a sectional view side elevation of the apparatus shown in FIG. 6A.

Referring to FIGS. 6A and 6B, a farther embodiment of the present invention is shown. While this embodiment also has a double-housing type configuration, it is distinguished from the other such configurations shown and described by two parallel culture beds laid in each housing and overhead type light source assemblies. As shown, two culture beds 400 and 402 each corresponding to the culture bed 102 of FIGS. 2A and 2B extend in the bottom of each of housings 404 and 406 parallel to each other. Two light source assemblies 408 and 410 are movable along two substantially parallel paths which extend above and along the culture beds 400 and 402, respectively. It will be seen that the overhead type light source assemblies 408 and 410 reciprocate with great ease on and along the flat tops of the housings 404 and 406.

In the apparatus shown in FIGS. 6A and 6B, it is preferable to incine lower portions of the side walls of each housing 404 or 406 as at 404a and 406b, and to treat their inner surfaces to be reflective for light, so that the reflective surfaces may reflect light from the overhead light source assemblies 408 and 410 to utilize the optical energy even more effectively. Side walls 404'a and 404'b may be formed transparent or comprised of half-mirrors in order to allow one to observe the growth of plants from outside the housing.

In FIGS. 6A and 6B, the reference numerals 412a and 412b designate photoradiators having light inlet ends which are arranged respectively along the reciprocating paths of the light source assemblies 408 and 410. In this construction, when the light source assemblies 408 and 410 have aligned respectively with the light inlet ends of the photoradiators 412a and 412b, the light emanating from the former is introduced into the latter. Again, the screens 112 and 114 (FIG. 2C) may be employed with this embodiment.

In any of the embodiments shown in FIGS. 3–6, the photoradiators may comprise any of the various configurations which have heretofore been proposed. For example, I have proposed photoradiators in the form of a light transmitting element having grooves on its surface, a light transmitting element having a transparent or semitransparent material whose refractive index is larger than that of the element applied thereto in a spiral or annular shape, a transparent hollow tube and rotatable transparent plates or rotatable plates with mirrors which are arranged in the tube to reflect light propagating through the tube to the ambience of the tube.

In summary, it will be seen that the present invention provides an apparatus for plant culture which promotes effective use of solar rays and artificial rays for cultivating plants and allows plants to be grown even in shaded places such as basements. Especially, where a housing of the apparatus is hermetically sealed, its interior can be optimumly conditioned for the growth of plants to still more effectively culture plants.

Various modifications will become possible for those skilled in the art after receiving the teachings of the present disclosure without departing from the scope thereof.

What is claimed is:

1. An apparatus for plant culture, comprising:
   a solar ray collector for collecting solar rays to introduce the solar rays into one end of light conducting members;
   at least one housing for accommodating plants, said housing having an air-tightly sealed structure, supply means for supplying said housing with air at suitable temperature and humidity which contains a high concentration of carbon dioxide; and
   light source assemblies mounted on an exterior side wall of said housing and each comprising an integral assembly at the other end of the light conducting members for emitting solar radiation and an artificial light source, said light source assemblies being movable on and along said exterior side wall of the housing to supply light sequentially to the plants in the housing.

2. An apparatus as claimed in claim 1, in which light issuing from the light source assemblies is visible light.

3. An apparatus as claimed in claim 1, in which inner surfaces of the housing are mirror-finished.

4. An apparatus as claimed in claim 1, in which the housing comprises a transverse housing and has a substantially hexagonal cross-section one side of which defines a bottom of the housing.

5. An apparatus as claimed in claim 4, in which the light source assemblies are movable respectively along two upper facing sides of the housing.

6. An apparatus as claimed in claim 1, in which the housing comprises an upright housing and has a substantially hexagonal cross-section, one end of the housing defining a bottom.

7. An apparatus as claimed in claim 1, in which each of the light source assemblies further comprises screen members which are positioned respectively at the front and the rear of the light source assembly with respect to an intended direction of movement of the light source assembly, said screen members being movable together with the light source assembly.

8. An apparatus as claimed in claim 2, in which inner surfaces of the screen members are reflective of light.

9. An apparatus as claimed in claim 1, comprising a plurality of said housings each for cultivating plants thereinside and each of which is air-tightly sealed and individually selectively supplied with oxygen and air at suitable temperature and humidity which contains a high concentration of carbon dioxide by said supply means, said side wall of each of the housings having transparent portions, each of the light source assemblies moving over the plurality of housings along said transparent side wall portions.

10. An apparatus as claimed in claim 9, in which the air-tightly sealed housings are serially connected to each other coaxially and horizontally.

11. An apparatus as claimed in claim 9, in which the air-tightly sealed housings are serially connected with each other coaxially and vertically.

12. An apparatus as claimed in claim 9 in which said supply means supplies each of the air-tightly sealed housings with the carbon dioxide containing air when illuminated by the light source assemblies, and further comprising oxygen-supplying means for supplying oxygen to each of the air-tightly sealed housings when non-illuminated by the light source assemblies.

13. An apparatus as claimed in claim 9, further comprising a plurality of light radiating members which are arranged inside each of the air-tightly sealed housings such that, while light from the light source assemblies are supplied to any of the air-tightly sealed housings, the light from the light source assemblies are introduced into said light radiating members.

14. An apparatus as claimed in claim 9, in which the housing is positioned horizontally, the light source assemblies being movable on and along said upper wall of the housing.

15. An apparatus as claimed in claim 14, in which two parallel culture beds are laid on a bottom of the housing, the light source assemblies being movable respectively along paths which extend on said upper wall of the housing in such a manner as to face said parallel culture beds.

16. An apparatus as claimed in claim 14, in which said housing has opposite side wall portions which are inclined and are reflective of light at inner surfaces thereof.

17. An apparatus as claimed in claim 14, in which said upper wall of the housing being transparent in portions thereof which are respectively associated with said paths of movement of the light source assemblies.

18. An apparatus as claimed in claim 14, in which light radiating members are disposed in the housing in alignment with the paths of movement of the light source assemblies.

19. An apparatus as claimed in claim 18, comprising a plurality of said air-tightly sealed housings, said upper wall having transparent portions, the light source assemblies moving over said housings on and along said transparent portions of said upper wall of each of said housings.

20. An apparatus as claimed in claim 19, in which two parallel culture beds are laid on a bottom of each of said housings, said light source assemblies moving over said housings along predetermined paths of movement which extend on the upper wall of each of the housings in such a manner as to face the culture beds.

21. An apparatus as claimed in claim 19, in which said supply means supplies each of the housings with carbon dioxide containing air at suitable temperature and humidity when illuminated by the light source assemblies, and further comprising oxygen-supplying means for supplying oxygen to each of the housings when non-illuminated by the light source assemblies.

22. An apparatus for plant culture, comprising:
a solar ray collector for collecting solar rays to introduce the solar rays into one end of light conducting members;
at least one housing for accommodating plants, said housing having an air-tightly sealed structure, supply means for supplying said housing with air at suitable temperature and humidity which contains a high concentration of carbon dioxide; and
light source assemblies mounted on an exterior upper wall of said housing and each comprising an integral assembly at the other end of the light conducting members for emitting solar radiation and an artificial light source, said light source assemblies being movable on and along said exterior upper wall of the housing to supply light sequentially to the plants in the housing.

23. An apparatus as claimed in claim 9 further comprising a plurality of light radiating members arranged in each of said air-tightly sealed housings, light transmitting members disposed externally of said housing, said solar ray collector introducing solar rays into one end of said light transmitting members, the other ends of said light transmitting members facing said light radiating members such that solar rays are transmitted to said light radiating members for radiation within said housing to enhance plant growth.

24. An apparatus as claimed in claim 9, wherein said other ends of said light transmitting members form part of an end portion of said light transmitting members, and means for mounting said end portions between two of said housings and movable between a first and a second position such that in said first position, said other ends face the photoradiators in one of said two spaced housings and in said second position, said other ends face the photoradiators in the other of said two spaced housings, whereby the solar rays are selectively directed into either one of said two spaced housings.

* * * * *